UNITED STATES PATENT OFFICE.

HERMAN DECKER, OF HANOVER, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING DERIVATIVES OF N-HOMOLOGUES OF THE NORHYDROHYDRASTININ.

1,156,134.  Specification of Letters Patent.  Patented Oct. 12, 1915.

No Drawing.  Application filed January 2, 1913. Serial No. 739,735.

*To all whom it may concern:*

Be it known that I, HERMAN DECKER, doctor of philosophy, chemist, citizen of the German Empire, residing at Hanover, Germany, have invented new and useful Improvements in Processes of Producing Derivatives of N-Homologues of the Norhydrohydrastinin, of which the following is a specification.

I have found that derivatives of homologues derived from norhydrohydrastinin (norhydrohydrastinin substances)

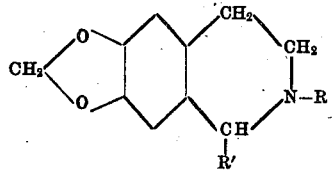

(R meaning alkyl, R' meaning hydrogen or alkyl or aryl) can be obtained by alkylizing norhydrohydrastinin and the substituted derivatives of norhydrohydrastinin, by alkylizing the primary condensation products of homopiperonylamin with aldehydes, as described in my Patent No. 1,073,966, Sept. 23, 1913, and transforming these alkylized primary condensation products; or by alkylizing the homopiperonylamin itself, condensing the alkylhomopiperonylamins with aldehydes to produce an alkylnorhydrohydrastinin and then transforming these compounds thus obtained. The products thus produced are valuable intermediate compounds for therapeutic remedies.

By the term "norhydrohydrastinin" I mean the simple or methyl-free mother substance of the series of bodies, the methyl derivative of which (hydrohydrastinin) occurs in nature.

In order to illustrate the new process more fully the following examples are given, the parts being by weight:—

Example 1: The homopiperonylamin is heated with formaldehyde and the resulting methylenehomopiperonylamin, which is a thick oil, is then transformed or condensed with 20% hydrochloric acid, whereupon the norhydrohydrastinin hydrochlorid crystallizes out. By treating this salt with alkali, free norhydrohydrastinin is obtained. It is a crystalline substance soluble in alcohol, benzene, ether and ligroin and insoluble in water. 100 parts of the norhydrohydrastinin are dissolved with 400 parts of benzene and heated with 72 parts of dimethyl sulfate for 10 minutes at 100° C. The precipitated viscous product is dissolved in water and is separated with the iodid of potassium. Besides the quarternary iodid, the iodid $C_{11}H_{14}NO_2I$, in the shape of fine yellow needles melting at 241° C., is obtained. The corresponding crystalline hydrochlorid melts at 274° to 276° C. and the picrate which forms light yellow needles, melts at 174° to 176° C. In the process of this example the norhydrohydrastinin hydrochlorid is first obtained by the condensation of homopiperonylamin with formaldehyde to form the methylenehomopiperonylamin and the conversion or transformation of this product into the closed ring product (norhydrohydrastininhydrochlorid) by the action of the hydrochloric acid, and from this hydrochlorid the free norhydrohydrastinin is obtained by treatment with alkali. The norhydrohydrastinin is then alkylized with alkyl sulfate to give the alkyl derivative, which in this case is hydrohydrastinin. The hydrochlorid can be similarly employed and converted into the methyl derivative, as described in Example 2. The reaction of this example may be represented graphically as follows:

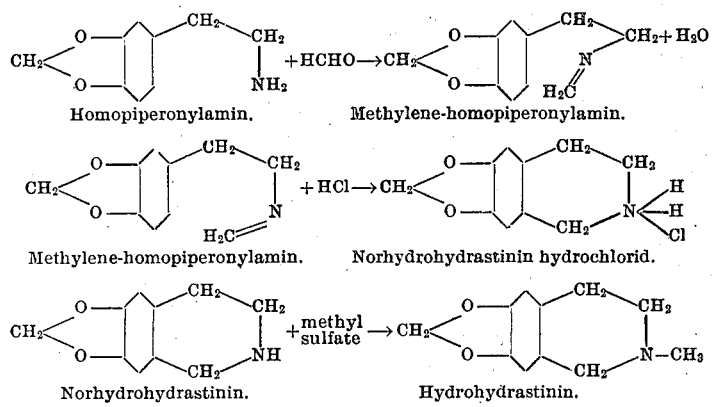

Example 2: 100 parts of the norhydrohydrastinin hydrochlorid, obtainable as described in Example 1, are heated under pressure with 200 parts of formaldehyde (40%) and 104 parts of hydrochloric acid (35%) for three hours at 120° C. The hydrochlorid of hydrohydrastinin, melting at 274° to 276° C. separates in a crystalline shape. It is similar to the iodid described in Example 1. The reaction of this example may be represented graphically as follows:

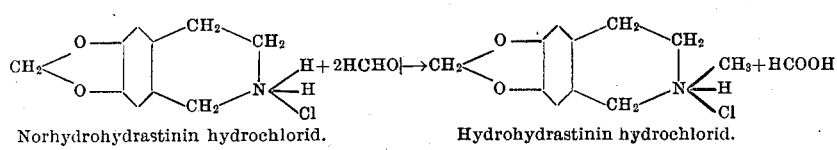

Example 3: 165 parts of homopiperonylamin are heated under pressure with 200 parts of formaldehyde (40%) and 104 parts of hydrochloric acid (35%) for three hours at 120° C. The hydrochlorid, $C_{11}H_{14}NO_2Cl$, melting at 274° to 276° C. is precipitated with common salt when the solution is cooled, and is the same as that described in Example 2. In the process of this example the condensation of the base with the aldehyde, the alkylation at the nitrogen atom, and the closing of the ring or molecular change into the hydrohydrastinin substance, are all effected in one operation. The complete reaction may be illustrated graphically as follows:

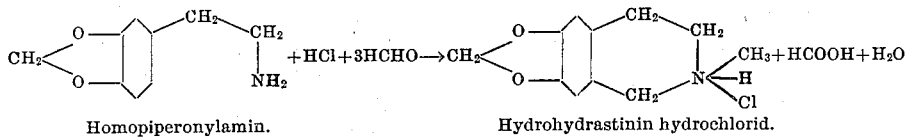

Instead of first condensing the base with formaldehyde to form the methylene derivative, it may be first converted into the methyl or other alkyl derivative and the alkyl derivative condensed and transformed into the closed ring compound. The alkyl derivatives of homopiperonylamin are obtainable, as described in my Patent No. 1,073,966 of September 23, 1913, from homopiperonylamin by condensing with an aldehyde, treating the condensation product with an alkyl halid and decomposition with steam of the resulting product. In the further treatment of these alkyl derivatives the condensation with the aldehyde and the transforming or closing of the ring can be effected in one operation, as illustrated by the following graphic equations:

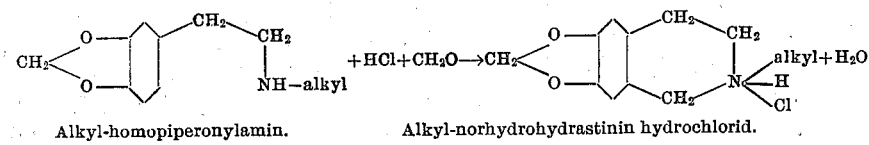

In the process of Example 3, instead of the homopiperonylamin, the alkyl derivatives, such as the methyl-, ethyl-, derivatives can be used in the manner just described.

The process of the present invention can be performed in an analogous manner when other transforming products of aldehyde and homopiperonylamins and other alkylizing agents than the above mentioned are used.

From the foregoing description it will be seen that according to Examples 1 and 2 the norhydrohydrastinin is alkylized directly to give the alkyl-norhydrohydrastinin, and where 1-substituted derivatives of norhydrohydrastinin are used, the corresponding alkylized (or arylized) derivatives are obtained. According to Example 3 the alkylization, condensation with the aldehyde, and ring formation are carried out all in one operation, when homopiperonylamin itself is used as the starting material, while the condensation and ring formation take place in one operation if the homopiperonylamin is first alkylized and the alkyl derivative is used. The three steps of alkylizing, condensing with an aldehyde, and ring formation may accordingly take place in one operation, or in two or three operations, and in different sequence, while the same ultimate result is obtained. In the accompanying claims it will be understood that these various steps can be performed in different orders, and I do not desire to limit myself to any particular order, or to the order in which the steps are referred to, except in the more specific claims in which the specific order of procedure is particularly set forth.

I claim:—

1. The process of producing alkyl derivatives of norhydrohydrastinin substances from homopiperonylamin which comprises subjecting the homopiperonylamin to the following steps,—condensing with an aldehyde, closing of the chain to form a ring by condensation and alkylizing at the nitrogen atom.

2. The process of producing alkyl derivatives of norhydrohydrastinin substances from homopiperonylamin which comprises subjecting the homopiperonylamin to condensation with an aldehyde to form a condensation product, and subsequently to the steps of condensing to close the chain to form a ring and alkylizing at the nitrogen atom.

3. The process of producing alkyl derivatives of norhydrohydrastinin substances from homopiperonylamin which comprises subjecting the homopiperonylamin to condensation with an aldehyde to form a condensation product, subsequently converting the open chain of such condensation product into a ring by condensation, and alkylizing the resulting nonhydrohydrastinin substance.

4. The process of producing norhydrohydrastinin substances from homopiperonylamin which comprises condensing homopiperonylamin with an aldehyde to form an open chain condensation product, and converting the open chain of the resulting condensation product into a ring by condensation in the presence of a condensing agent.

5. The process of producing alkyl derivatives of norhydrohydrastinin substances which comprises subjecting the primary condensation products of homopiperonylamin and aldehydes to the following steps,—closing of the chain to form a ring by condensation and alkylization at the nitrogen atom.

6. The process of producing alkyl derivatives of norhydrohydrastinin substances which comprises subjecting the primary condensation products of homopiperonylamin and aldehydes to ring formation by condensation in the presence of a condensing agent, and subsequently alkylizing the resulting hydrohydrastinin substance to form the alkyl derivatives.

7. The process of producing the methyl derivative of norhydrohydrastinin which comprises subjecting homopiperonylamin to the following steps,—condensation with formaldehyde, closing of the chain to form a ring by condensation and methylation at the nitrogen atom.

8. The process of producing hydrohydrastinin which comprises subjecting homopiperonylamin to the following steps,—condensation with formaldehyde, closing of the chain to form a ring by condensation under the influence of hydrochloric acid, and methylation at the nitrogen atom.

In testimony whereof I have hereunto set my hand in the presence of two subscribing witnesses.

HERMAN DECKER.

Witnesses:
MARIE RÖSELER,
MARIE BEHNE.

Correction in Letters Patent No. 1,156,134.

It is hereby certified that in Letters Patent No. 1,156,134, granted October 12, 1915, upon the application of Herman Decker, of Hanover, Germany, for an improvement in "Processes of Producing Derivatives of N-Homologues of the Norhydrohydrastinin," an error appears in the printed specification requiring correction as follows: Page 3, line 61, claim 3, for the word "nonhydrohydrastinin" read *norhydrohydrastinin;* and that the said Letters Patent should be read with this correction therein that the same may conform to the record of the case in the Patent Office.

Signed and sealed this 11th day of January, A. D., 1916.

[SEAL.]

J. T. NEWTON,

*Acting Commissioner of Patents.*

Cl. 23—24.